(12) United States Patent
Albrecht

(10) Patent No.: US 10,594,551 B2
(45) Date of Patent: Mar. 17, 2020

(54) MODULAR INDUSTRIAL AUTOMATION DEVICE AND METHOD FOR CONFIGURING A MODULAR INDUSTRIAL AUTOMATION DEVICE

(71) Applicant: Siemens Aktiengesellschaft, Munich (DE)

(72) Inventor: Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 15/641,950

(22) Filed: Jul. 5, 2017

(65) Prior Publication Data

US 2018/0013619 A1 Jan. 11, 2018

(30) Foreign Application Priority Data

Jul. 6, 2016 (EP) .................................. 16178147

(51) Int. Cl.
*H04L 12/24* (2006.01)
*H04L 12/40* (2006.01)
(Continued)

(52) U.S. Cl.
CPC .......... *H04L 41/0806* (2013.01); *H04L 12/40* (2013.01); *H04L 12/66* (2013.01); *H04L 29/12028* (2013.01); *H04L 45/021* (2013.01); *H04L 45/42* (2013.01); *H04L 45/44* (2013.01); *H04L 61/6068* (2013.01); *H04L 67/104* (2013.01); *H04L 69/16* (2013.01); *H04L 69/169* (2013.01)

(58) Field of Classification Search
CPC ..... H04L 41/0806; H04L 45/42; H04L 45/44; H04L 29/12028; H04L 45/021; H04L 69/169; H04L 12/40; H04L 12/66; H04L 69/16; H04L 67/104; H04L 61/6068
See application file for complete search history.

(56) References Cited

U.S. PATENT DOCUMENTS

| 2002/0059485 A1 | 5/2002 | Godicke et al. |
| 2004/0114591 A1 | 6/2004 | Naismith et al. |

(Continued)

FOREIGN PATENT DOCUMENTS

| EP | 2913727 | 9/2015 |
| EP | 2988465 | 2/2016 |
| EP | 3142296 | 3/2017 |

*Primary Examiner* — Moo Jeong
(74) *Attorney, Agent, or Firm* — Cozen O'Connor

(57) ABSTRACT

Modular industrial automation device and method for configuring a modular industrial automation device, wherein in order to configure the modular industrial automation device which includes a central unit and at least one communication module which each comprise a router module and a routing configuration unit, the routing configuration units transmit routing information stored in their routing table to routing configuration units of other router modules, and the routing configuration units update their respective routing table based on routing information which is received from routing configuration units of other router modules and relates to routes to IPv4 subnetworks assigned to other router modules, a default gateway and a connection between the associated router module and a backplane bus system.

22 Claims, 2 Drawing Sheets

(51) Int. Cl.
  *H04L 12/66* (2006.01)
  *H04L 12/717* (2013.01)
  *H04L 12/721* (2013.01)
  *H04L 12/755* (2013.01)
  *H04L 29/06* (2006.01)
  *H04L 29/08* (2006.01)
  *H04L 29/12* (2006.01)

(56) References Cited

U.S. PATENT DOCUMENTS

| | | | |
|---|---|---|---|
| 2005/0190754 A1* | 9/2005 | Golikeri | H04L 29/12009 370/383 |
| 2007/0061455 A1 | 3/2007 | Callaghan | |
| 2007/0217392 A1* | 9/2007 | Motosugi | H04L 12/40032 370/351 |
| 2011/0069698 A1* | 3/2011 | Schmidt | H04L 12/403 370/351 |
| 2015/0249552 A1 | 9/2015 | Albrecht et al. | |

* cited by examiner

MODULAR INDUSTRIAL AUTOMATION DEVICE AND METHOD FOR CONFIGURING A MODULAR INDUSTRIAL AUTOMATION DEVICE

BACKGROUND OF THE INVENTION

1. Field of the Invention

The present invention relates to industrial automation system and, more particularly, to a method and modular industrial automation device which can be configured with little effort and which enables routing between a plurality of subnets to which the automation device is connected.

2. Description of the Related Art

Industrial automation systems are used to monitor, control and regulate technical processes, particularly in the field of manufacturing, process and building automation, and enable operation of control devices, sensors, machines and industrial installations which is intended to be performed as independently as possible and independently of human interventions. In this case, it is particularly important to provide monitoring, control and regulation functions in real time.

Interference in communication connections between automation devices or computer units of an industrial automation system may result in disadvantageous repetition of a transmission of a service requirement. In particular, messages that have not been transmitted or have not been completely transmitted may prevent an industrial automation system from changing to or remaining in a safe operating state and may result in failure of an industrial installation. A costly production standstill is usually associated with failure of a production installation. In industrial automation systems, a particular problem results from message traffic having a comparatively large number of, but relatively short, messages to be transmitted in real time. This intensifies the above problems.

European patent application EP15185045.0 discloses a modular control device of an industrial automation system, which comprises a central unit and at least one communication module each with an integrated router. In order to configure this modular control device, router configuration units of first routers detect available router functions and associated priority values of other routers. First routers have an extended router function for connection to a superordinate communication network. Second routers comprise a restricted router function for connection to a subordinate field level subnet. If there are further first routers, the router configuration units of the first routers each use the priority values to check which first router the highest priority value is assigned to. The first router with the highest priority value is configured as the superordinate router for connection to a superordinate communication network.

EP2913727A1 discloses a modular industrial automation device having a backplane bus system and a plurality of functional modules connected to the backplane bus system. The functional modules each comprise a communication network adapter, a protocol functional unit for implementing a communication protocol stack and a MAC bridge element linked to the communication network adapter. Provision is also made of a router module which is connected to the backplane bus system and comprises a communication network adapter, a router functional unit that is linked to the communication network adapter and is intended to implement a router communication protocol stack, and a respective virtual communication network adapter for each functional module. Such a virtual communication network adapter links the router functional unit to the MAC bridge element of the respective functional module via the backplane bus system. Only the communication protocol stack of the router module comprises routing functions. The messages are forwarded based on the destination MAC address.

EP2988465A1 relates to a method for transmitting an IP data packet from a first automation module of a modular controller to a second automation module of the modular controller via a backplane bus of the modular controller. In this case, the IP data packet comprises a header region and a data region. A transport data packet is created from an IP data packet available in the first automation module. The transport data packet comprises a selection of the data from the header region of the IP data packet and the data region of the IP data packet. The transport data packet is transmitted to the second automation module via the backplane bus. The IP data packet is then reconstructed from the transport data packet.

US 2004/0114591 A1 describes a programmable logic controller that comprises a backplane bus system and modules that are connected to the backplane bus system and communicate via the backplane bus system using the Internet communication protocol (IP). Here, each module has its own IP address.

SUMMARY OF THE INVENTION

It is an object of the present invention to provide a modular industrial automation device which can be configured with little effort and enables routing between a plurality of subnets to which the automation device is connected, and to provide a suitable method for configuring the modular industrial automation device.

These and other objects and advantages are achieved in accordance with the invention by a modular industrial automation device and a method, where the automation device comprises a central unit for processing control programs and at least one communication module and a backplane bus system that is configured as an IPv4 subnetwork. The central unit and the at least one communication module are interconnected via the backplane bus system and each have a router module for implementing a communication protocol stack comprising network layer functions. The communication protocol stacks implemented by the router modules are preferably Internet Protocol (IP) stacks, in particular Transmission Control Protocol/Internet Protocol (TCP/IP) stacks or User Datagram Protocol/Internet Protocol (UDP/IP) stacks.

The central unit and the at least one communication module additionally each comprise a first communication network adapter for connecting the router module to the backplane bus system and at least one second communication network adapter for connecting the router module to a superordinate communication network configured as an IPv4 subnetwork or to a subordinate field level subnet configured as an IPv4 subnetwork. The communication network adapters preferably each comprise a transmitting and receiving unit, in particular a PHY circuit for implementing a physical interface corresponding to the ISO model, and a functional unit for controlling access to a communication medium, in particular a MAC circuit implementation of a data link layer corresponding to the OSI model. In addition, the central unit and the at least one communication module each have a routing table assigned to the router module, and a routing configuration unit for updating the respective routing table.

In accordance with the invention, the routing configuration units are configured, in particular via configuration, to transmit routing information stored in the respective routing table to routing configuration units of other router modules. The routing configuration units are also configured to update the respective routing table based on routing information that is received from routing configuration units of other router modules with respect to routes to IPv4 subnetworks assigned to other router modules, a default gateway and the connection between the associated router module and the backplane bus system. This contributes to the fact that an engineering system is not needed to configure the router modules and no routes have to be manually set up at the user end so that the subnets to which the modular industrial automation device is connected are reachable for one another.

The routing configuration units can also be configured, for example, to interchange routing information with one another via peer-to-peer communication and to signal a configuration error if routing information which contradicts a respective own configuration is received. In accordance with an alternative embodiment of the present invention, precisely one routing configuration unit is configured as a MASTER routing configuration unit, while all other routing configuration units are configured as SLAVE routing configuration units. The SLAVE routing configuration units are configured to transmit routing information stored in the respective routing table to the MASTER routing configuration unit. In contrast, the MASTER routing configuration unit is configured to distribute routing information available in the MASTER routing configuration unit to the SLAVE routing configuration units and to select and predefine precisely one router as a default gateway for all router modules. The routing configuration unit of the central unit is advantageously configured as a MASTER routing configuration unit.

The MASTER routing configuration unit is preferably also configured to distribute routing information available in the MASTER routing configuration unit to the SLAVE routing configuration units and to select and predefine precisely one router as a default gateway for all router modules. The SLAVE routing configuration units are also advantageously configured to update the respective routing table based on routing information that is received from the MASTER routing configuration unit with respect to routes to IPv4 subnetworks assigned to other router modules, the default gateway and the connection between the associated router module and the backplane bus system.

In accordance with another embodiment of the present invention, the MASTER routing configuration unit is also configured to update its associated routing table based on routing information that is received from SLAVE routing configuration units with respect to routes to IPv4 subnetworks assigned to other router modules, the default gateway and the connection between the associated router module and the backplane bus system. In addition, the MASTER routing configuration unit can also be configured to signal a configuration error if there is more than one default gateway. The MASTER routing configuration unit preferably comprises a central database that stores details of the IPv4 subnetwork assigned to the backplane bus system, an IPv4 address of the router module which is intended to be connected to the default gateway, which address is assigned to the backplane bus system, the IPv4 addresses of all router modules, which addresses are assigned to the backplane bus system, and IPv4 subnetworks assigned to the router modules.

The central unit and the at least one communication module can each have, for example, a router configuration unit for providing the associated router module and the respective routing configuration unit with interface information assigned to the first and second communication network adapters. The router configuration unit is advantageously connected to the associated first and second communication network adapters, and the interface information comprises details of IPv4 addresses assigned to the first and second communication network adapters and IPv4 network masks assigned to the superordinate communication network or to the subordinate field level subnet. The interface information may comprise, in particular, details of a default gateway. In addition, the respective router configuration unit may be, for example, a DCP server corresponding to the Discovery and Basic Configuration Protocol.

In accordance with the method of the invention for configuring a modular industrial automation device which comprises a backplane bus system, a central unit for processing control programs and at least one communication module, the backplane bus system is configured as an IPv4 subnetwork. The central unit and the at least one communication module are interconnected via the backplane bus system and each have a router module for implementing a communication protocol stack comprising network layer functions. The central unit and the at least one communication module also each comprise a first communication network adapter for connecting the router module to the backplane bus system and at least one second communication network adapter for connecting the router module to a superordinate communication network configured as an IPv4 subnetwork or to a subordinate field level subnet configured as an IPv4 subnetwork. In addition, the central unit and the at least one communication module each have a routing table assigned to the router module, and a routing configuration unit for updating the respective routing table.

In accordance with the invention, the routing configuration units transmit routing information stored in the respective routing table to routing configuration units of other router modules. The routing configuration units update the respective routing table based on routing information that is received from routing configuration units of other router modules with respect to routes to IPv4 subnetworks assigned to other router modules, a default gateway and the connection between the associated router module and the backplane bus system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment on the basis of the drawing, in which.

DETAILED DESCRIPTION OF THE EXEMPLARY EMBODIMENTS

Figure 1:
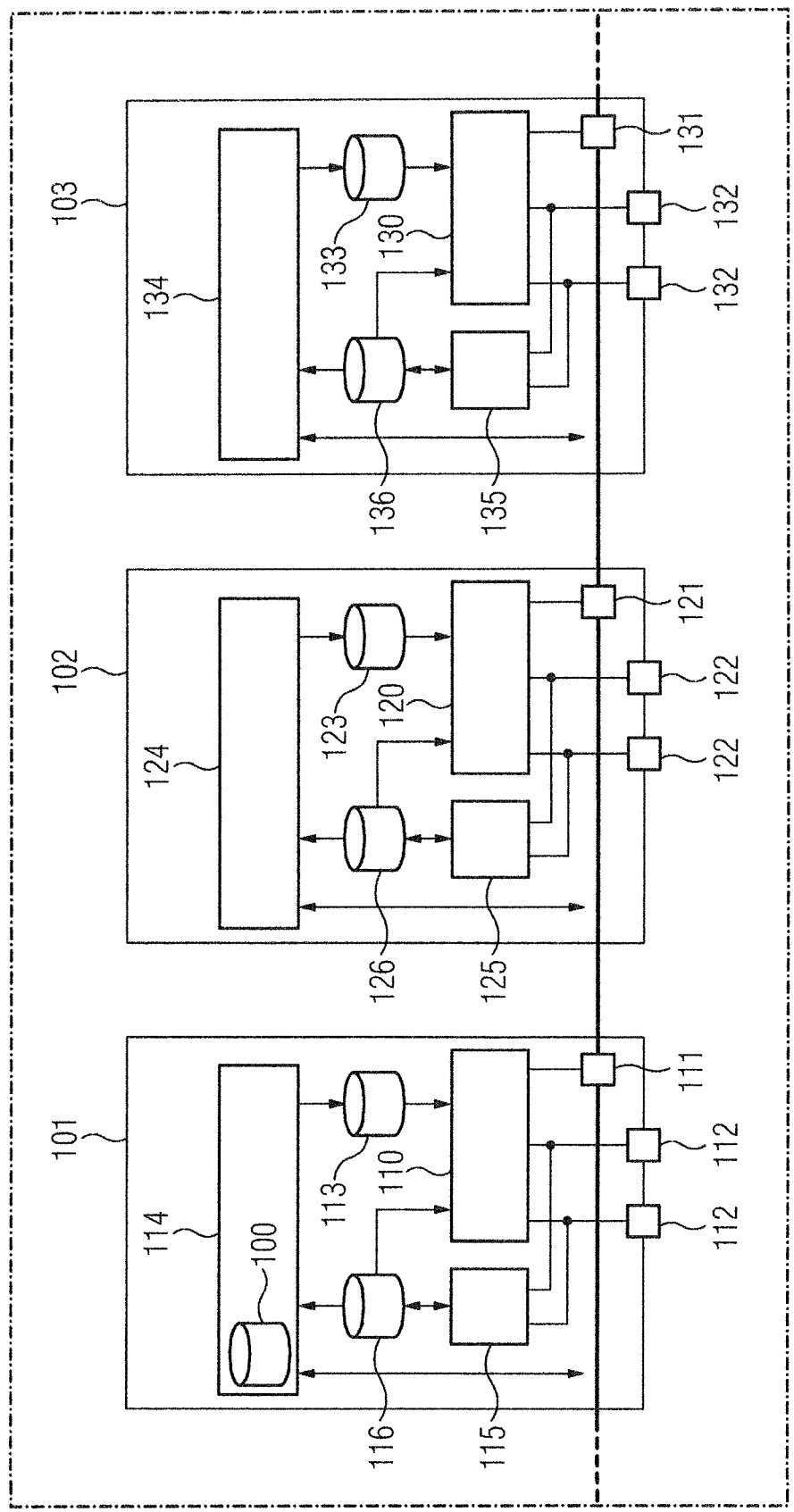
FIG. 1 shows a schematic illustration of a modular automation device of an industrial automation system having a central unit and a plurality of communication modules each comprising a router module in accordance with the invention.

The modular automation device of an industrial automation system, as illustrated in FIG. 1, has a central unit 101 for processing control programs and two communication modules 102, 103. The central unit 101 and the communication modules 102 are interconnected via a backplane bus system 104 which is configured as an IPv4 subnetwork. In the present exemplary embodiment, the modular automation device is a programmable logic controller.

The central unit 101 and the two communication modules 102, 103 each have a router module 110, 120, 130 for implementing a communication protocol stack comprising network layer functions. The communication protocol stacks implemented by the router modules 110, 120 are preferably IP stacks, in particular Transmission Control Protocol/Internet Protocol (TCP/IP) stacks or User Datagram Protocol/Internet Protocol (UDP/IP) stacks. The central unit 101 and the two communication modules 102, 103 also each comprise a first communication network adapter 111, 121, 131 for connecting the respective router module 110, 120, 130 to the backplane bus system 104. The central unit 101 and the two communication modules 102, 103 each additionally have a plurality of second communication network adapters 112, 122, 132 for connecting the respective router module 110, 120, 130 to a superordinate communication network configured as an IPv4 subnetwork or to a subordinate field level subnet configured as an IPv4 subnetwork. The superordinate communication network may be an installation network, for example. In addition, the central unit 101 and the two communication modules 102, 103 each comprise a routing table 113, 123, 133 assigned to the respective router module 110, 120, 130 and a routing configuration unit 114, 124, 134 for updating the respective routing table 113, 123, 133. These each comprise a transmitting and receiving unit implemented by via a PHY circuit and a functional unit which is implemented via a MAC circuit and is intended to control access to a communication medium. The router modules 110, 120, 130 access their communication network adapters 111-112, 121-122, 131-132 via interface drivers as hardware abstraction elements.

The routing configuration units 114, 124, 134 each transmit routing information stored in their routing table 113, 123, 133 to routing configuration units 114, 124, 134 of other router modules 110, 120, 130. The routing configuration units 114, 124, 134 each update their routing table 113, 123, 133 based on routing information received from routing configuration units 114, 124, 134 of other router modules 110, 120, 130 with respect to routes to IPv4 subnetworks assigned to other router modules 110, 120, 130, a default gateway and the connection between the associated router module 110, 120, 130 and the backplane bus system 104. In principle, the routing configuration units 114, 124, 134 can interchange routing information with one another via peer-to-peer communication. In this case, the routing configuration units 114, 124, 134 may signal a configuration error if routing information which contradicts their own configuration is received.

As an alternative to a peer-to-peer approach, the routing configuration unit 114 of the central unit 101 is configured as a MASTER routing configuration unit in the present exemplary embodiment, whereas the routing configuration units 124, 134 of the communication modules 102, 103 are configured as SLAVE routing configuration units. The SLAVE routing configuration units 124, 134 transmit routing information stored in their associated routing table 123, 133 to the MASTER routing configuration unit 114. The MASTER routing configuration unit 114 updates its associated routing table 113 based on routing information received from SLAVE routing configuration units 124, 134 with respect to routes to IPv4 subnetworks assigned to other router modules 120, 130, the default gateway and the connection between its associated router module 110 and the backplane bus system 104. The MASTER routing configuration unit 114 preferably signals a configuration error if there is more than one default gateway.

In order to consistently manage routing information, the MASTER routing configuration unit 114 comprises a central database 100 which stores details of:
- the IPv4 subnetwork assigned to the backplane bus system 104,
- an IPv4 address of the router module 110, 120, 130 which is intended to be connected to the default gateway, where these address is assigned to the backplane bus system 104,
- the IPv4 addresses of all router modules 110, 120, 130, where these addresses are assigned to the backplane bus system 104, and
- IPv4 subnetworks that are assigned to the router modules 110, 120, 130 and can be directly or indirectly reached by the respective router module 110, 120, 130 via its second communication network adapter 112, 122, 132.

The IPv4 addresses of the router modules 110, 120, 130 that are assigned to the backplane bus system 104 may result, for example, from a hardware slot on the backplane bus system 104 for the respective router module 110, 120, 130.

The MASTER routing configuration unit 114 distributes routing information available in the central database 100 to the SLAVE routing configuration units 124, 134 and selects precisely one router as a default gateway for all router modules 110, 120, 130, as a result of which the default gateway is consistently predefined for all router modules 110, 120, 130. The SLAVE routing configuration units 124, 134 update their routing table 123, 133 on the basis of routing information which is received from the MASTER routing configuration unit 114 regarding:
- routes to IPv4 subnetworks assigned to other router modules 110, 120, 130,
- the default gateway, and
- the connection between the associated router module 110, 120, 130 and the backplane bus system 104.

The central unit 101 and the communication modules 102, 103 each have a router configuration unit 115, 125, 135 for providing interface information that is assigned to their first and second communication network adapters 111-112, 121-122, 131-132. For this purpose, the router configuration units 115, 125, 135 are connected to the associated communication network adapters 111-112, 121-122, 131-132. The router configuration units 115, 125, 135 may be, for example, DCP servers corresponding to the Discovery and Basic Configuration Protocol and may be used to provide basic PROFINET functions.

The interface information is stored by the router configuration units 115, 125, 135 in a memory unit 116, 126, 136 of the respective router configuration unit 115, 125, 135 and is provided such that it can be retrieved from there for the associated router module 110, 120, 130 and for the respective routing configuration unit 114, 124, 134. The interface information comprises details of IPv4 addresses assigned to the respective first and second communication network adapters and IPv4 network masks assigned to the superordinate communication network or to the subordinate field level subnet. The interface information also indicates the default gateway. The interface information is used not only to configure the respective local communication protocol stack but also to generate IPv4 subnetwork information via the routing configuration units 114, 124, 134 with respect to the IPv4 subnetworks which can be reached via the respective router modules 110, 120, 130.

Figure 2:
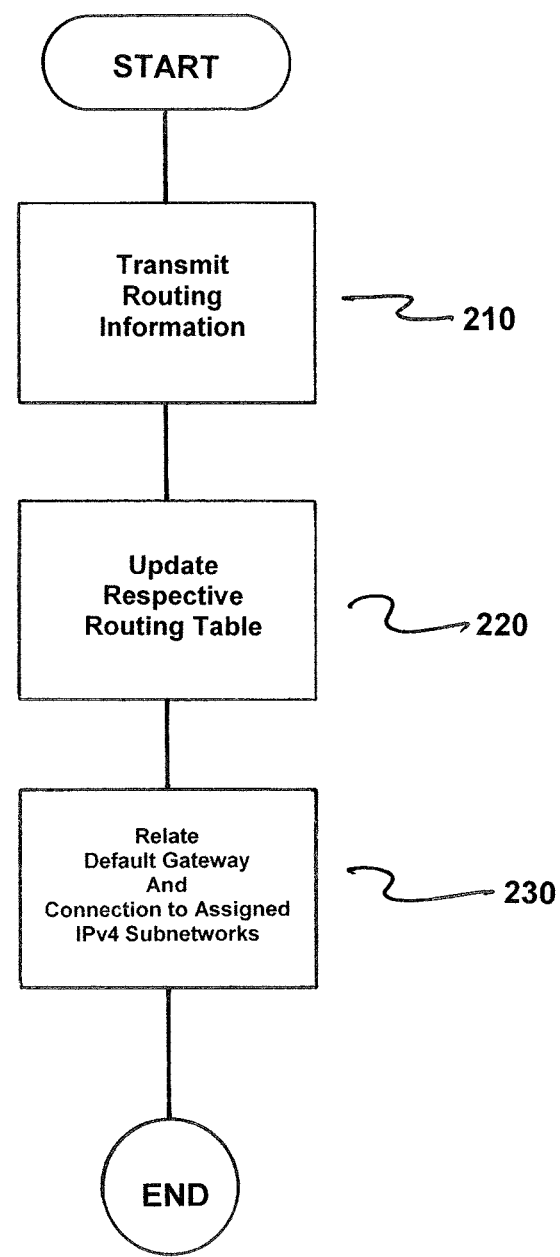
FIG. 2 is a flowchart of the method in accordance with the invention.

FIG. 2 is a flowchart of the method for configuring a modular industrial automation device, where the modular industrial automation device comprises a backplane bus system, a central unit for processing control programs and at least one communication module. In accordance with the method of the invention, the backplane bus system is configured as an IPv4 subnetwork, where the central unit and the at least one communication module are interconnected via the backplane bus system and each include a router module for implementing a communication protocol stack comprising network layer functions, a first communication network adapter for connecting the router module to the backplane bus system, at least one second communication network adapter for connecting the router module to one of (i) a superordinate communication network configured as an IPv4 subnetwork and (ii) a subordinate field level subnet configured as an IPv4 subnetwork, a routing table assigned to the router module, and a routing configuration unit for updating each respective routing table. The method comprises transmitting from the routing configuration units routing information stored in the respective routing table to routing configuration units of other router modules, as indicated in step 210.

Next, the routing configuration units update the respective routing table based on routing information that is received from routing configuration units of the other router modules, as indicated in step 220.

Next, the routing configuration units relates a default gateway and the connection between the associated router module and the backplane bus system routes to IPv4 subnetworks assigned to other router modules, as indicated in step 230.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A modular industrial automation device, comprising:
   a central unit for processing control programs and at least one communication module;
   a backplane bus system which is set up as an IPv4 subnetwork, the central unit and the at least one communication module being interconnected via the backplane bus system and each of the central unit and the at least one communication module including:
      a router module for implementing a communication protocol stack comprising network layer functions;
      a first communication network adapter for connecting the router module to the backplane bus system,
      at least one second communication network adapter for connecting the router module to one of (i) a superordinate communication network configured as an IPv4 subnetwork and (ii) a subordinate field level subnet set up as an IPv4 subnetwork,
      a routing table assigned to the router module, and
      a routing configuration unit for updating the routing table;
   wherein each routing configuration unit of the central unit and the at least one communication module is configured to transmit routing information stored in the routing table to routing configuration units of other router modules of the central unit and the at least one communication module; and
   wherein each routing configuration unit of the of the central unit and the at least one communication module is further configured to update the routing table based on routing information which is received from routing configuration units of other router modules of the central unit and the at least one communication module with respect to routes to IPv4 subnetworks assigned to (i) other router modules of the central unit and the at least one communication module, (ii) a default gateway and (iii) a connection between an associated router module and the backplane bus system.

2. The automation device as claimed in claim 1, wherein precisely one routing configuration unit is configured as a MASTER routing configuration unit;
   wherein all other routing configuration units of the central unit and the at least one communication module are configured as SLAVE routing configuration units;
   wherein the SLAVE routing configuration units are configured to transmit routing information stored in a respective routing table of the central unit and the at least one communication module to the MASTER routing configuration unit;
   wherein the MASTER routing configuration unit is configured to distribute routing information available in the MASTER routing configuration unit to the SLAVE routing configuration units and to select and predefine precisely one router as the default gateway for all router modules of the central unit and the at least one communication module; and
   wherein the SLAVE routing configuration units are further configured to update a routing table of the central unit and the at least one communication module based on routing information which is received from the MASTER routing configuration unit with respect to the routes to the IPv4 subnetworks assigned to (i) other router modules of the central unit and the at least one communication module, (ii) the default gateway and (iii) the connection between the associated router module and the backplane bus system.

3. The automation device as claimed in claim 2, wherein the MASTER routing configuration unit is further configured to update its associated routing table based on routing information which is received from SLAVE routing configuration units with respect to the routes to the IPv4 subnetworks assigned to (i) other router modules of the central unit and the at least one communication module, (ii) the default gateway and (iii) the connection between the associated router module and the backplane bus system.

4. The automation device as claimed in claim 2, wherein the MASTER routing configuration unit is further configured to signal a configuration error if more than one default gateway exists.

5. The automation device as claimed in claim 3, wherein the MASTER routing configuration unit is further configured to signal a configuration error if more than one default gateway exists.

6. The automation device as claimed in claim 2, wherein the MASTER routing configuration unit comprises a central database which stores details of the IPv4 subnetwork assigned to the backplane bus system, an IPv4 address of a router module which is intended to be connected to the default gateway and which is assigned to the backplane bus system, IPv4 addresses of all router modules of the central unit and the at least one communication module and which are assigned to the backplane bus system, and IPv4 subnetworks assigned to router modules.

7. The automation device as claimed in claim 2, wherein the routing configuration unit of the central unit is configured as a MASTER routing configuration unit.

8. The automation device as claimed in claim 1, wherein routing configuration units are further configured to interchange routing information with one another via peer-to-peer communication and further configured to signal a configuration error if routing information which contradicts a respective own configuration is received.

9. The automation device as claimed in claim 1, wherein the central unit and the at least one communication module each include a router configuration unit for providing an associated router module and a respective routing configuration unit with interface information assigned to the first and second communication network adapters.

10. The automation device as claimed in claim 9, wherein the router configuration unit is connected to associated first and second communication network adapters; and
wherein the interface information comprises details of IPv4 addresses assigned to the first and second communication network adapters and IPv4 network masks assigned to one of (i) the superordinate communication network and (ii) the subordinate field level subnet.

11. The automation device as claimed in claim 10, wherein the interface information comprises details of the default gateway.

12. The automation device as claimed in claim 9, wherein the router configuration unit is a Discovery and Basic Configuration Protocol (DCP) server corresponding to the Discovery and Basic Configuration Protocol.

13. The automation device as claimed in claim 1, wherein the communication protocol stacks implemented by router modules of the central unit and the at least one communication module comprise internet protocol (IP) stacks.

14. The automation device as claimed in claim 1, wherein the communication network adapters each comprise a transmitting and receiving unit and a functional unit for controlling access to a communication medium.

15. The automation device as claimed in claim 13, wherein the IP stacks comprise one of Transmission Control Protocol/Internet Protocol (TCP/IP) stacks and User Datagram Protocol (UDP/IP) stacks.

16. A method for configuring a modular industrial automation device, the modular industrial automation device comprising a backplane bus system, a central unit for processing control programs and at least one communication module, the backplane bus system being configured as an IPv4 subnetwork, the central unit and the at least one communication module being interconnected via the backplane bus system and each of the central unit and the at least one communication module including a router module for implementing a communication protocol stack comprising network layer functions, a first communication network adapter for connecting the router module to the backplane bus system, at least one second communication network adapter for connecting the router module to one of (i) a superordinate communication network configured as an IPv4 subnetwork and (ii) a subordinate field level subnet configured as an IPv4 subnetwork, a routing table assigned to the router module, and a routing configuration unit for updating each respective routing table, the method comprising:
transmitting from the routing configuration units routing information stored in the respective routing table to routing configuration units of other router modules;
updating, by routing configuration units, the respective routing table based on routing information which is received from routing configuration units of the other router modules; and
relating, by routing configuration units, a default gateway and a connection between the associated router module and the backplane bus system routes to IPv4 subnetworks assigned to other router modules.

17. The method as claimed in claim 16, wherein precisely one routing configuration unit is configured as a MASTER routing configuration unit;
wherein all other routing configuration units are configured as SLAVE routing configuration units;
wherein the SLAVE routing configuration units transmit routing information stored in the respective routing table to the MASTER routing configuration unit;
wherein the MASTER routing configuration unit distributes routing information available in the MASTER routing configuration unit to the SLAVE routing configuration units and selects and predefines precisely one router as the default gateway for all router modules of the central unit and the at least one communication module; and
wherein the SLAVE routing configuration units update the respective routing table based on routing information which is received from the MASTER routing configuration unit and relates to routes to IPv4 subnetworks assigned to (i) other router modules of the central unit and the at least one communication module, (ii) the default gateway and (iii) a connection between an associated router module and the backplane bus system.

18. The method as claimed in claim 17, wherein the MASTER routing configuration unit updates its associated routing table based on routing information which is received from SLAVE routing configuration units and relates to (i) routes to IPv4 subnetworks assigned to other router modules of the central unit and the at least one communication module, (ii) the default gateway and (iii) the connection between the associated router module and the backplane bus system.

19. The method as claimed in claim 17, wherein the MASTER routing configuration unit signals a configuration error if there is more than one default gateway.

20. The method as claimed in claim 18, wherein the MASTER routing configuration unit signals a configuration error if there is more than one default gateway.

21. The method as claimed in claim 17, wherein the routing configuration unit of the central unit is configured as a MASTER routing configuration unit.

22. The method as claimed in claim 16, wherein routing configuration units interchange routing information with one another via peer-to-peer communication and signal a configuration error if routing information which contradicts a respective own configuration is received.

* * * * *